US008325725B2

(12) United States Patent
Nanda et al.

(10) Patent No.: US 8,325,725 B2
(45) Date of Patent: Dec. 4, 2012

(54) EFFICIENT HOST MANAGEMENT PROTOCOL ON MULTICAST CAPABLE ROUTER

(75) Inventors: Avoy K. Nanda, Milpitas, CA (US); Kunal R. Shah, Mountain View, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 414 days.

(21) Appl. No.: 12/506,108

(22) Filed: Jul. 20, 2009

(65) Prior Publication Data

US 2011/0013629 A1    Jan. 20, 2011

(51) Int. Cl.
*H04L 12/28* (2006.01)
(52) U.S. Cl. .......................... 370/390; 370/392
(58) Field of Classification Search .................. 370/254, 370/351, 390, 392, 393, 401
See application file for complete search history.

(56) References Cited

U.S. PATENT DOCUMENTS

| 6,324,575 | B1* | 11/2001 | Jain et al. ................ 709/221 |
| 7,478,173 | B1* | 1/2009 | Delco ............................ 709/250 |
| 7,593,402 | B2* | 9/2009 | Song et al. .................... 370/390 |
| 7,675,936 | B2* | 3/2010 | Mizutani et al. ............. 370/466 |
| 8,102,870 | B2* | 1/2012 | Guo et al. ..................... 370/432 |
| 2007/0064695 | A1 | 3/2007 | Song et al. |
| 2007/0086458 | A1 | 4/2007 | Narayanan et al. |
| 2007/0223490 | A1 | 9/2007 | Mizutani et al. |
| 2009/0150966 | A1 | 6/2009 | Alao et al. |
| 2009/0219933 | A1 | 9/2009 | Guo et al. |
| 2010/0046516 | A1 | 2/2010 | Fernandez Gutierrez |
| 2010/0265869 | A1 | 10/2010 | Sarikaya |
| 2011/0013630 | A1* | 1/2011 | Nanda et al. .................. 370/390 |

FOREIGN PATENT DOCUMENTS

EP   2066073 A1   6/2009

OTHER PUBLICATIONS

Ericsson, Non-Final Office Action mailed Jan. 23, 2012, for U.S. Appl. No. 12/558,365., 9 pages.

* cited by examiner

*Primary Examiner* — Robert Wilson
*Assistant Examiner* — Brian O Connor
(74) *Attorney, Agent, or Firm* — Blakely Sokoloff Taylor & Zafman, LLP

(57) ABSTRACT

A method reduces computational and/or bandwidth requirements of multicast routing by efficiently communicating required source state information. The method comprises receiving at a first network element, executing a modified host management protocol, a source interest list from a host over a network, the source interest list identifies at least one multicast source to be one of excluded or included from routing to the host. The modified host management protocol identifies a difference between the source interest list and a source state maintained by the first network element. The modified host management protocol provides the difference between the source interest list and the source state and not an entirety of the source interest list to a multicast routing protocol to alter the set of multicast sources to be routed to the host.

18 Claims, 2 Drawing Sheets

EFFICIENT HOST MANAGEMENT PROTOCOL ON MULTICAST CAPABLE ROUTER

CROSS-REFERENCE TO RELATED APPLICATIONS

The present application is related to co-pending application (U.S. patent application number 12/558,365) titled "Light Host Management Protocol on Multicast Capable Router," filed on the same date as the present application.

FIELD OF THE INVENTION

Embodiments of the present invention relate to a system for managing multicast communication. Specifically, embodiments of the invention relate to efficient management of host requests for source data over a multicast network.

BACKGROUND

The use of multicast protocols and the administration of networks implementing multicast protocols are expanding to support new technologies such as Internet Protocol Television (IPTV) and on demand video. These networks utilize set top boxes (STBs), also referred to as hosts, which request data from a list of sources that are specified by the STBs. The sources are data sources that are available over a multicast network such as IPTV channels. These sources can be streamed using multicast to any number of hosts.

The STBs send their list of sources that they are requesting to receive through the multicast network via a host management protocol (HMP). HMPs incorporate or utilize Internet Group Management Protocol (IGMP) and Multicast Listener Discover (MLD). These protocols then communicate the requested list of sources to a multicast routing protocol (MRP) to establish the routing of each requested source to the respective hosts. The MRPs include Protocol Independent Multicast (PIM). In some instances the requested source interest list is transmitted through an L2 snooping device to a multicast router that executes the MRP.

The HMP communicates the entire list of requested sources to the MRP each time a source interest list is received from a host. This causes the MRP to reprocess sources that it has previously received from the HMP. There are two lists of sources that can be provided by the HMP to the MRP. One list of sources is a set of sources to be included (i.e., the host is requesting that these sources be sent to it) and the other list of source is a set of sources to be excluded (i.e., the host is requesting that these resources not be sent to it). Multiple hosts on each subnet send these source interest lists and the HMP constructs and aggregates a source state per subnet comprising the interested sources for all the hosts on that subnet. When any of these hosts sends a new source interest list, the entire aggregated state in the HMP is sent to the MRP.

In a network where a L2 snooping network element is present between the hosts and the multicast router, the HMP on the L2 network element processes the received source interest lists from the hosts to update the snooping state maintained by it and forwards the sources lists in their entirety to the router so that the MRP can update the routing. On the router, the MRP is assisted by a local HMP to process the received source interest lists and communicate the received source interests to the MRP.

SUMMARY

The embodiments of the invention include a method for reducing computational and/or bandwidth requirements of multicast routing by efficiently communicating required source state information. The method comprises the steps of receiving at a first network element, executing a modified host management protocol, a source interest list from a host over a network, the source interest list identifies at least one multicast source to be one of excluded from or included in routing to the host. The modified host management protocol identifies a difference between the source interest list and a source state maintained by the first network element, wherein the source state includes at least one of an exclude state that identifies at least one multicast source to exclude from a host or an include state that identifies at least one multicast source to provide to a host. The modified host management protocol communicates the difference between the source interest list and the source state if one exists, and not an entirety of the source interest list to a multicast routing protocol to alter the set of multicast sources to be routed to the host.

The embodiments of the invention include a host device to generate a source interest list based on user input and to transmit the source interest list over a network to a first network element, the source interest list to identify at least one multicast source to be one of excluded or included from routing to the host. The first network element is in communication with the host device over the network. The first network element executes a modified host management protocol, the modified host management protocol to identify any differences between the source interest list and a source state maintained by the first network element, wherein the source state includes at least one of an exclude state that identifies at least one multicast source to exclude from a host device and an include state that identifies at least one multicast source to provide to the host device. The modified host management protocol provides only the difference between the source interest list and the source state and not an entirety of the source interest list to a multicast routing protocol to alter the set of multicast sources to be provided to the host device.

The embodiments of the invention include a network element to reduce computational and/or bandwidth requirements of multicast routing by efficiently communicating required source state information, the network element comprising a modified host management protocol component to receive a source interest list from a host over a network, wherein the source interest list identifies at least one multicast source to be one of excluded from or included in routing to the host. The modified host management protocol component identifies any differences between the source interest list and a source state maintained by the modified host management protocol component, wherein the source state includes at least one of an exclude state that identifies at least one multicast source to exclude from a host and an include state that identifies at least one multicast source to provide to the host. The modified host management protocol component communicates the difference between the source interest list and the source state to a multicast routing protocol to alter the set of multicast sources to be routed to the host.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect

DETAILED DESCRIPTION

Figure 1:
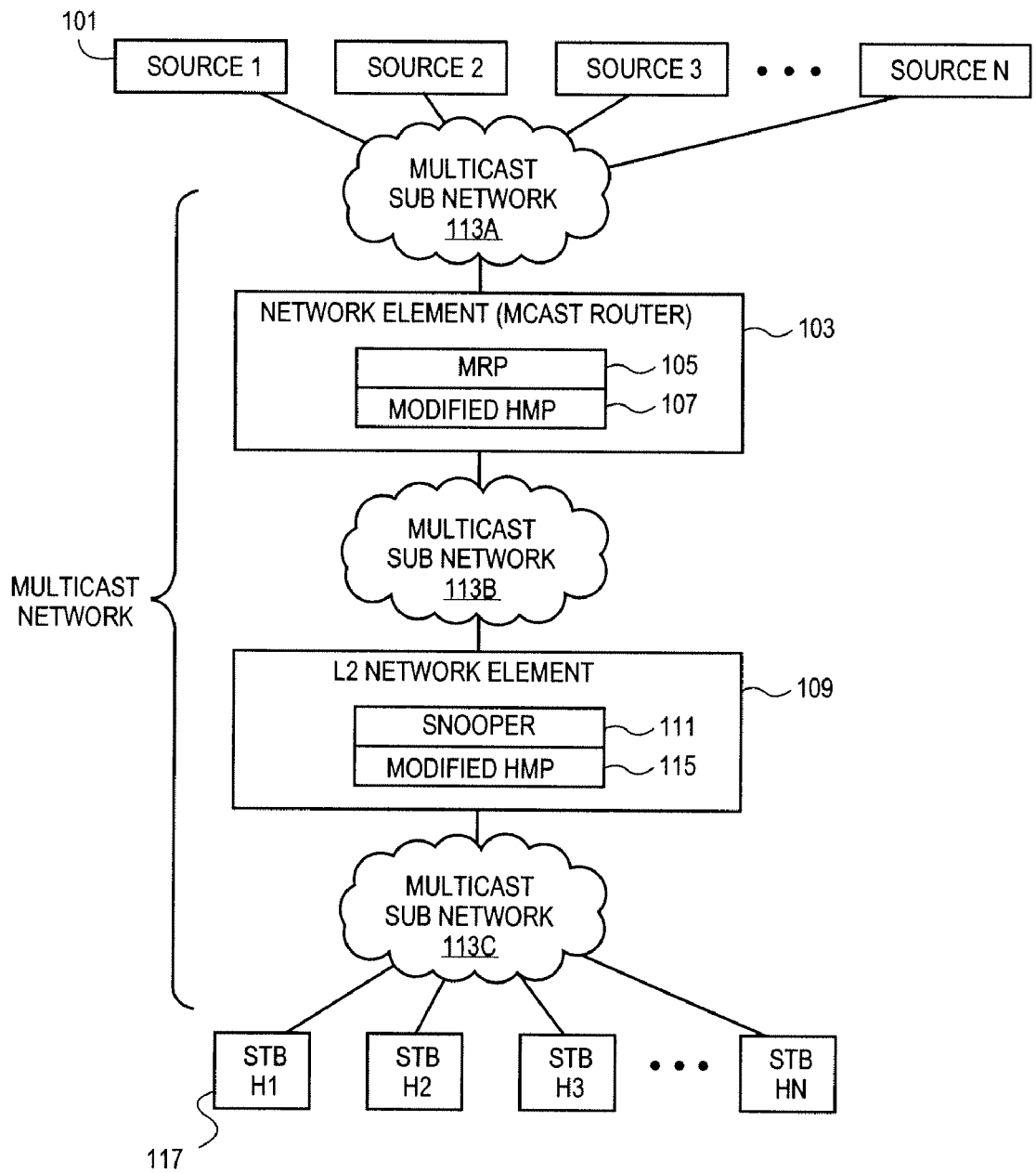
FIG. 1 is a diagram of one embodiment of a network for modified host management and multicast routing.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

The operations of the flow diagram will be described with reference to the exemplary embodiment of FIG. 1. However, it should be understood that the operations of the flow diagram can be performed by embodiments of the invention other than those discussed with reference to FIG. 1, and the embodiments discussed with reference to FIG. 1 can perform operations different than those discussed with reference to the flow diagrams.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; or phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, and/or subscriber management, multicast routing, IPTV), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV channels or sources, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

The embodiments of the present invention provide a system, network and method for avoiding the disadvantages of the prior art including: duplication of information processing each time a host sends a message containing previously received sources, creation of two lists (i.e., include lists and exclude lists) when sending source information, poor scaling due to the large size of source lists, vulnerability to denial of service attacks by repeated sending of large source lists, slow processing time inducing delay in the system and longer 'zapping' times (i.e., time required to change between sources).

The embodiments of the invention overcome these disadvantages by identifying differences between source interest lists received from hosts and a source state at network element. Only the differences between the source interest list and the source state are provided to the multicast routing protocol. This provides the following advantages: more efficient processing due to avoiding processing and transmission or sharing of duplicate information, simplified processing for the multicast routing protocol by providing it only a single smaller source interest list to process, scalability due to only processing the differences between source state and source interest list information, enhanced security enabled by ignoring redundant source interest lists, improved zapping times due to overall network and system efficiency.

FIG. 1 is a diagram of one embodiment of a network for modified host management and multicast routing. The network includes a set or sources 101, a multicast network including multicast sub networks 113A-113C, a multicast router 103, L2 network element 109 and set top boxes (STBs) 117 and similar components. A 'set,' as used herein refers to any positive whole number of items including one item. The multicast sub networks 113A-113C connecting the components of the system can be separate networks, different aspects of the same network or combinations thereof. The multicast sub networks 113A-113C can be local area networks (LANs), wide area networks (WANs), such as the Internet, or similar networks. The multicast sub networks 113A-113C can include any combination of wired or wireless network elements and end stations and lines of communication between the network elements and end stations.

The STBs 117 can be any type of host device for managing the delivery of source data to a user. An example of a STB is console device for delivering Internet Protocol Television (IPTV) to a user. STBs 117 can include console devices, gaming devices, desktops, workstations, digital video recorders (DVRs), optical disk playback devices (e.g., digital versatile disc (DVD) players), handheld devices, cellular phones and similar computing devices. These devices execute software or include hardware components that manage the user experience and generate requests for any number of data sources 101.

These STBs 117 or 'hosts' generate a list of sources that are of interest to a user or 'source interest lists' that are sent to network element 109 executing a modified host management protocol (HMP). In one embodiment, these source interest lists contain a full set of all sources that the STB 117 is requesting in the form of an include list or an exclude list. In another embodiment, the source interest lists received from a STB 117 may only reflect changes to its source interests. An include list is a set of sources that the STB 117 is requesting to be sent to the STB 117. An exclude list is a set of sources that the STB 117 is requesting not to be sent to the STB 117. Each time a list is sent by the STB 117 it may be list of new sources or a complete list reflecting all user input or settings received to that point. The format of the message can be in the Internet Group Management Protocol (IGMP) or Multicast Listener Discover (MLD) formats or any similar protocol used to convey host information to the Multicast network elements. These messages can be sent over the multicast sub network 113C to an L2 network element 109 or a multicast router 103.

The invention encompasses alternative embodiments including an embodiment where the STBs 117 communicate directly with a modified HMP 107 on a multicast router 103 or similar network element. In another embodiment, the invention includes at least one L2 network element 109 where a modified HMP 115 processes the source interest lists received from the STBs 117.

In the embodiment of the multicast network where an L2 network element 109 is present, a modified HMP 115 on the L2 network element 109 process each received message from each of the hosts and maintains a source state based on the source interest list for each STB 117. The processing of the messages received from the STBs 117 is discussed in greater detail herein below in reference to FIG. 2. The modified HMP 115 identifies the differences between the received source interest list and the maintained source state. The modified HMP 115 then provides this information to a multicast routing protocol (MRP) by generating a message to be sent through a remote modified HMP 107 to the remote MRP 105 or calls a function or method (e.g., of an application programming interface (API)) of a local MRP or local L2 snooper 111.

The message or call passes on only the difference in state or sources instead of the entire source interest list to minimize the computational resources and bandwidth required to update the multicast routing. The MRP updates the multicast routing from the various sources 101 in accordance with the received source interest list change. The MRP can be any multicast routing protocol including Protocol Independent Multicast (PIM), PIM—sparse mode and similar MRPs.

The modified HMP 115 and MRP or L2 snooper 111 present on the L2 network element 109, as well as, the modified HMP 107 and MRP 105 present on the multicast router 103 can be implemented as a software components in the form of instructions to be executed by line cards, control cards, network processors or similar processing components of the respective network elements 109, 103. In other embodiments, these elements are implemented as firmware or hardware components.

Source state information can be tracked as an aggregate of all STBs 117 connected to a network element on a multicast subnet 113C, as separate information for each STB or similarly tracked. Similarly, the source state information can be tracked as a set of source identifiers, source addresses or similar information sufficient for identifying a specific source in the multicast network. The source state can be implemented by separately tracking sources to exclude from each host, sources to include for each host or by complete tracking of either. The source state can also be tracked for both individual STBs 117 and multiple STBs in aggregate. In one embodiment, the source state is tracked in aggregate for a specific sub network 113C and any number of sub networks can be supported in this manner.

In multicast networks where an L2 network element 109 is present, but the MRP 105 is only present on a separate multicast router 103, the message with the identified source differences is sent over the multicast sub network 113B to a modified HMP 107 present on the multicast router 103. The message may be in a standard message format according to IGMP or MLD that is handled by a modified HMP local to the multicast router 103 or a modified message format. The modified HMP 107 processes the received message and calls (e.g., through a function or method of an API) the MRP 105 to provide it with the source interest list changes that were received. Upon receipt of the updated source interest list, the MRP updates its routing tables to provide the requested data from sources 101 to the STBs 117 over the multicast sub network 113A.

The L2 network element 109 can be any type of network element capable of executing a modified HMP and snooper or providing modified HMP or snooper implementation in firmware or hardware or any combination thereof. The L2 network element 109 can support any number of STBs 117 or hosts using any type of networking protocol. The multicast network can include any number of L2 network elements 109 that operate in parallel to service the STBs 117.

The multicast router 103 is a network element that implements multicast routing through the MRP. The multicast router 103 can be any type of networking element capable of implementing MRP 105 and a modified HMP 107. The multicast router 103 can support any number of STBs 117 or hosts, sources 101 or L2 network elements 109 using any type of networking protocol. The multicast system can include any number of multicast routers 103 that operate in parallel to service the STBs 117 and sources 101.

The sources 101 can be any type of data sources provided by any number of end station servers. The data sources 101 can be streaming or static data sources. The data provided can be IPTV data or similar sources suitable for multicasting. The servers providing these services can utilize any multicast routing protocol for transmitting these source data to the hosts over the multicast network including the multicast sub networks 113A-113C. The servers providing the sources 101 can be any type of computing devices including dedicated server machines, desktops, workstations or similar computing devices.

Figure 2:
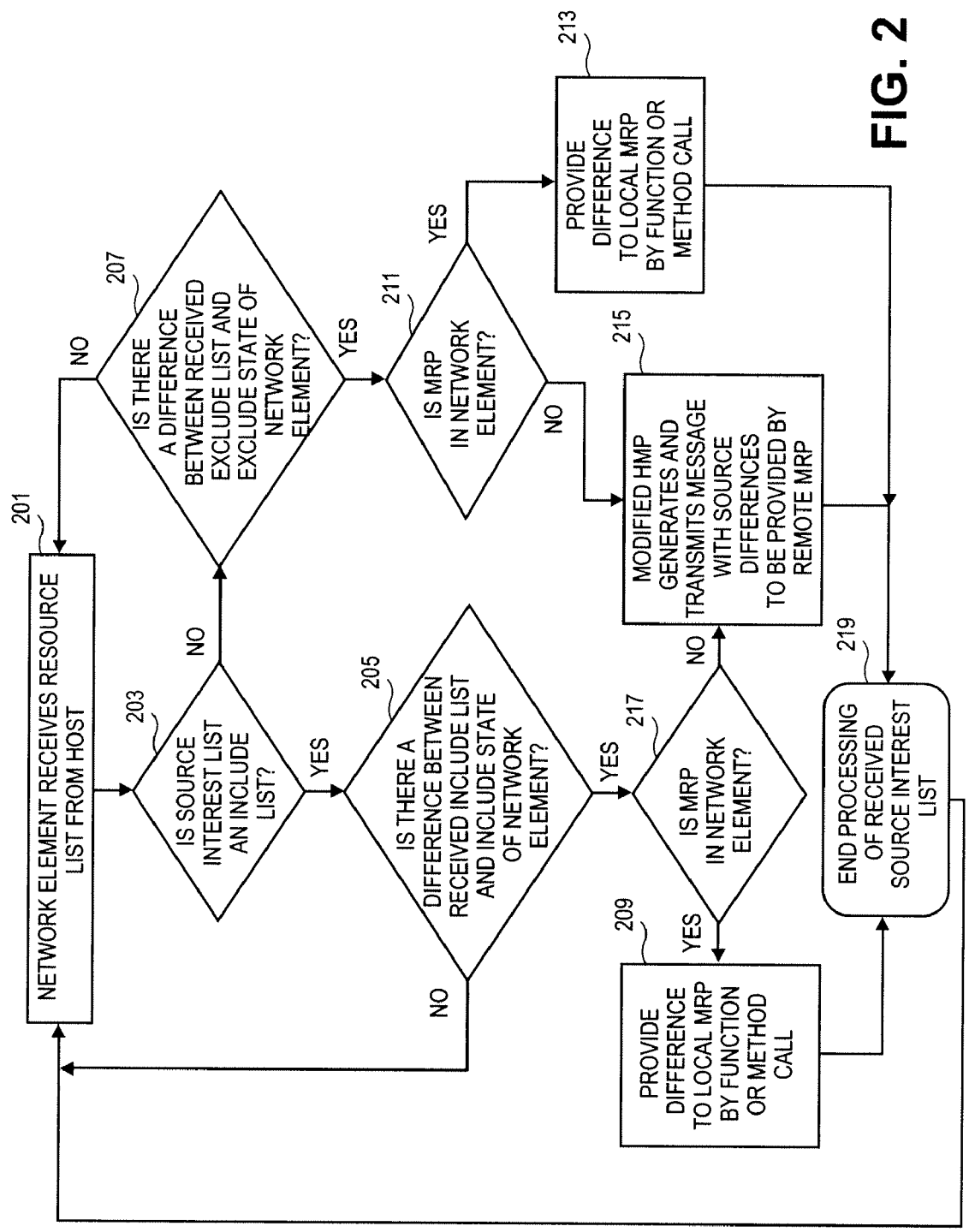
FIG. 2 is a flowchart of one embodiment of a process for source interest list processing.

FIG. 2 is a flowchart of one embodiment of a process for source interest list processing. This process is primarily implemented at the network element executing the modified HMP and/or the device implementing the MRP. The process interacts with each of the components of the multicast network that have been separately initialized including the hosts (e.g., the STBs), modified HMP and MRP across the relevant network elements in the multicast network including L2 network elements, multicast routers and related machines. The process is continuously executed and triggered by the generation of a source interest list at a host and the reception of this source interest list at the network element executing the modified HMP (block 201). The source interest list can be periodically generated by the host or generated in response to a user interaction with the host such as the user specifying a new source to be requested.

The source interest list is sent to the modified HMP implemented either at an L2 network element or at a multicast router. The modified HMP analyzes the source interest list to determine if it is an include list (i.e., a source interest list that indicates each of the sources that the host is requesting to be sent to the host) (block 203). In other embodiments, source interest lists and source states may only be implemented as effective include lists or exclude lists. One skilled in the art would understand that these are subsets of the process described herein.

If the source interest list is not an include list, then it is known that the list is an exclude list (i.e., a source interest list that indicates each of the sources that the host does not want to receive). The modified HMP then compares the received source interest list with the exclude source state maintained by the modified HMP to determine whether there are any differences (block 207). If there are not differences between the received exclude list and the maintained exclude state then no action is required and the process awaits the next received source interest list (block 201).

However, if the comparison of the received exclude list and the exclude state maintained by the modified HMP reveals a differences, then the modified HMP determines whether the MRP is present on the same device as the modified HMP carrying out the comparison (block 211). If the MRP is present on the same device, then the modified HMP sends the differences between the received exclude list and the current exclude state to the MRP via a function or method call or similar process (block 213). The function or method call can be made through an application programming interface (API) or similar interface. Providing the changes to the MRP completes the handling of the source interest list in the process (block 219) and the process awaits the reception of the next source interest list (block 201).

If the MRP is not present on the same device as the modified HMP, then the modified HMP prepares a message to be sent to the MRP at the multicast router or similar location (block 215). The message provides the differences between the received exclude list and the exclude state maintained by the modified HMP. In all cases, the modified HMP updates the maintained state to reflect the received exclude list. The HMP message can be a standard HMP or modified HMP message. After the message is sent, the processing of the received source interest list has completed (block 219) and the process awaits the reception of the next source interest list (block 201).

If the received source interest list is an include list (i.e., a source interest list that identifies those sources a host want to receive), then the modified HMP compares the received source interest list to the maintained include source state (block 205). If there is no difference between the received source interest list and the include source state maintained by the modified HMP, then no action is taken and the process awaits the next source interest list to be received (block 201).

If the comparison reveals differences between the received source interest list and the maintained include source state, then the modified HMP determines whether the MRP is present on the current network element (block 217). If the MRP is present on the current network element, then the modified HMP sends the difference between the received source interest list and the maintained include source state through a function or method call (e.g., a method or function of an API) to the MRP or similar mechanism (block 209). If the MRP is not present on the same network element as the modified HMP, then the modified HMP generates a message in a standard or modified HMP format. The HMP message is then sent to the multicast router (block 215). After the differences are provided to the MRP the processing of the received source interest list ends (block 219). The process then awaits the receipt of another source interest list (block 201). The include source state is updated to reflect the changes of the received source interest list during the comparison of the two.

Thus, a method, system and apparatus for host protocol management have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method in a first network element for reducing computational and/or bandwidth requirements of multicast routing by efficiently communicating required source state information, the method comprising the steps of:
receiving a source interest list from a host over a network, wherein the source interest list identifies at least one multicast source to be one of excluded and included from routing to the host;
identifying by a modified host management protocol a difference between the source interest list and a source state maintained by the first network element, wherein the source state includes at least one of an exclude state and an include state, wherein the exclude state identifies at least one multicast source to exclude from any one of a plurality of hosts in communication with the first network element, the plurality of hosts including the host, and wherein the include state identifies at least one multicast source to provide to the plurality of hosts;
providing by the modified host management protocol the difference between the source interest list and the source state to a multicast routing protocol to alter the set of multicast sources to be routed to the host, the difference being a partial part of the source interest list.

2. The method of claim 1, wherein the step of providing comprises the step of:
calling by the modified host management protocol a function or a method of the multicast routing protocol.

3. The method of claim 1, wherein the step of providing comprises the steps of:
generating a message by the modified host management protocol including the difference between the source interest list and the source state; and
transmitting the message by the modified host management protocol from the first network element to a second network element executing the multicast routing protocol.

4. The method of claim 1, wherein the multicast routing protocol is protocol independent multicast - sparse mode, and wherein the source interest list is formatted according to one of an internet group management protocol and a multicast listener discovery protocol.

5. The method of claim 1, further comprising the step of:
identifying whether the source interest list is an exclude list or an include list.

6. The method of claim 1, wherein the source interest list received by the first network element from the host identifies all multicast sources to be one of excluded and included for the host.

7. A network with reduced computational and/or bandwidth requirements of multicast routing by efficiently communicating required source state information, the network comprising:
a host device configured to generate a source interest list based on user input and configured to transmit the source interest list over a network to a first network element, the source interest list to identify at least one multicast source to be one of excluded and included from routing to the host; and the first network element in communication with the host device over the network, the first network element configured to execute a modified host management protocol, the modified host management protocol configured to identify any differences between the source interest list and a source state maintained by the first network element, wherein the source state includes at least one of an exclude state that identifies at least one multicast source to exclude from a plurality of host devices, including the host device, and an include state that identifies at least one multicast source to provide to the plurality of host devices, the host modified management protocol configured to provide only the difference between the source interest list and the source state to a multicast routing protocol to alter the set of multicast sources to be provided to the host device, the difference being a partial part of the source interest list.

8. The network of claim 7, wherein the first network element includes the multicast routing protocol, and wherein the modified host management protocol calls one of a function or a method of the multicast routing protocol.

9. The network of claim 7, further comprising:
a second network element, which includes the multicast routing protocol, in communication with the first network element over the network, the second network element configured to receive the difference between the source interest list and the source state and not an entirety of the source interest list from the host management protocol.

10. The network of claim 7, wherein the multicast routing protocol is protocol independent multicast - sparse mode, and wherein the source interest list is formatted according to one of an internet group management protocol and a multicast listener discovery protocol.

11. The network of claim 7, wherein the first network element identifies whether the source interest list is an exclude list or an include list.

12. The network of claim 7, wherein the source interest list received by the first network element from the host device identifies all multicast sources to be one of excluded and included for the host device.

13. A network element to reduce computational and/or bandwidth requirements of multicast routing by efficiently communicating required source state information, the network element comprising:
a modified host management protocol component configured to receive a source interest list from a host over a network, wherein the source interest list identifies at least one multicast source to be one of excluded from or included in routing to the host, the host modified management protocol component configured to identify any differences between the source interest list and a source state maintained by the modified host management protocol component, wherein the source state includes at least one of an exclude state that identifies at least one multicast source to exclude from a plurality of hosts including the host and an include state that identifies at least one multicast source to provide to the plurality of hosts, the modified host management protocol component configured to transmit a difference between the source interest list and the source state to a multicast routing protocol to alter the set of multicast sources to be routed to the host, the difference being a partial part of the source interest list.

14. The network element of claim 13, further comprising: the multicast routing protocol, wherein the modified host management protocol component calls one of a method or function of the multicast routing protocol.

15. The network element of claim 13, wherein the modified host management protocol component configured to generate a message including the difference between the source interest list and the source state where the difference is a partial part of the source interest list, and wherein the host management protocol component is configured to transmit the message to a router that includes the multicast routing protocol.

16. The network element of claim 13, wherein the multicast routing protocol is protocol independent multicast —sparse mode, and wherein the source interest list is formatted according to one of an internet group management protocol and a multicast listener discovery protocol.

17. The network element of claim 13, wherein the network element identifies whether the source interest list is an exclude list or an include list.

18. The network element of claim 13, wherein the source interest list received by the network element from the host identifies all multicast sources to be one of excluded and included for the host.

* * * * *